O. M. MÜLLER.
LOCKING DEVICE FOR MINERS' LAMPS.
APPLICATION FILED MAR. 3, 1908.

921,868.

Patented May 18, 1909.
3 SHEETS—SHEET 1.

Witnesses:
Arthur E. Zumpe
August Miner

Inventor:
Otto Max Müller
by Hauser v Biesen Atty.

O. M. MÜLLER.
LOCKING DEVICE FOR MINERS' LAMPS.
APPLICATION FILED MAR. 3, 1908.
921,868.
Patented May 18, 1909.
3 SHEETS—SHEET 2.
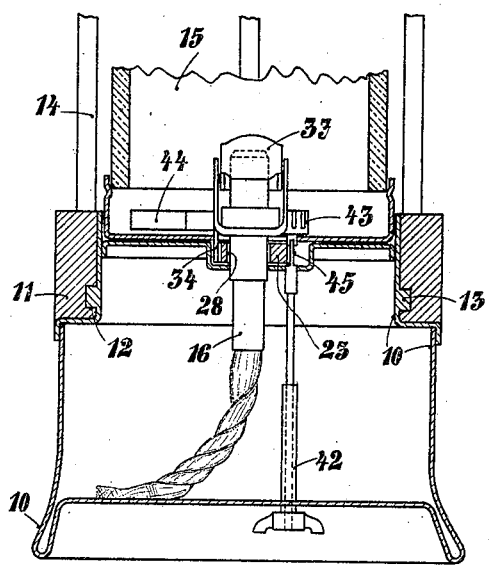
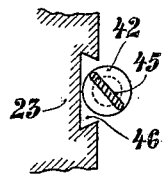
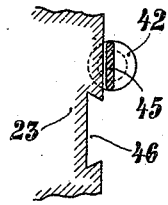
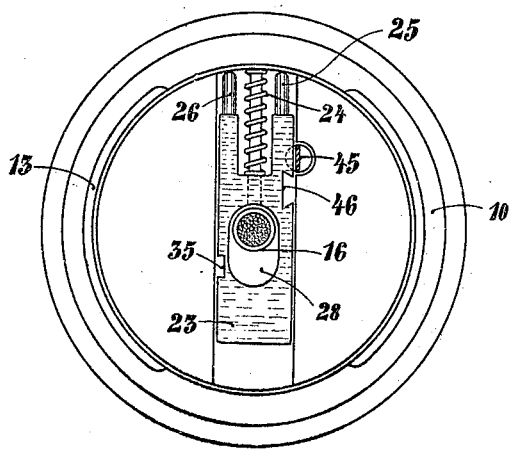
Witnesses:
Inventor

O. M. MÜLLER.
LOCKING DEVICE FOR MINERS' LAMPS.
APPLICATION FILED MAR. 3, 1908.

921,868.

Patented May 18, 1909.
3 SHEETS—SHEET 3.

Witnesses:
Arthur E. Zumpfe
August Miner

Inventor
Otto Max Müller
By Frank v. Briesen Atty

UNITED STATES PATENT OFFICE.

OTTO MAX MÜLLER, OF GELSENKIRCHEN-SCHALKE, GERMANY.

LOCKING DEVICE FOR MINERS' LAMPS.

No. 921,868.   Specification of Letters Patent.   Patented May 18, 1909.

Application filed March 3, 1908. Serial No. 418,965.

*To all whom it may concern:*

Be it known that I, OTTO MAX MÜLLER, a citizen of Germany, residing at Gelsenkirchen-Schalke, Germany, have invented new and useful Improvements in Locking Device for Miners' Lamps, of which the following is a specification.

This invention relates to a miner's lamp which is secured against opening by unauthorized persons. Furthermore, the construction is such that the light becomes automatically extinguished when the lamp is unlocked, and that it can be lighted only in its locked condition.

Figure 1:
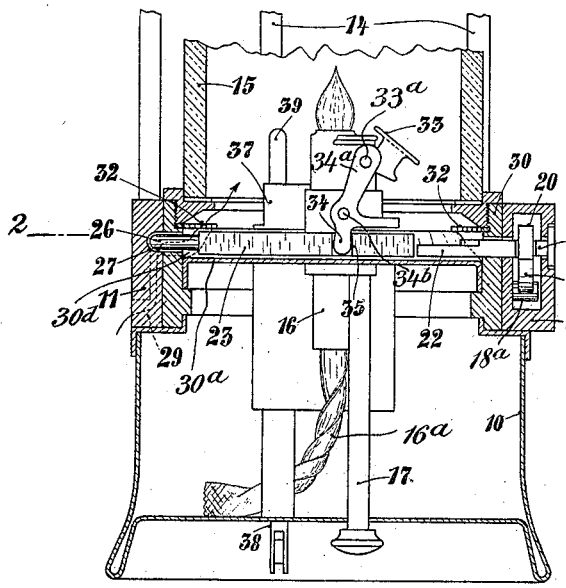
Figure 3:
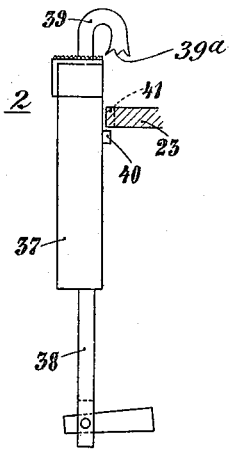
Figure 2:
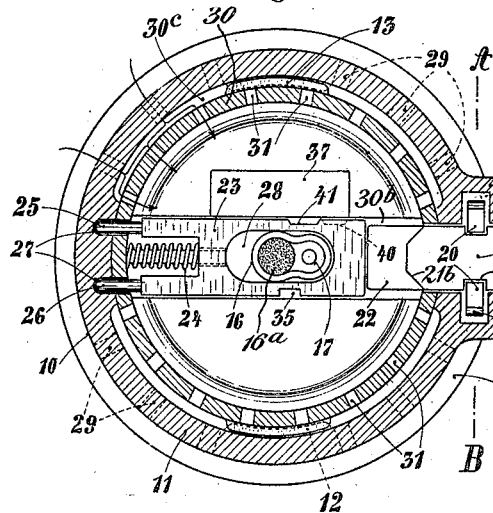
Figure 4:
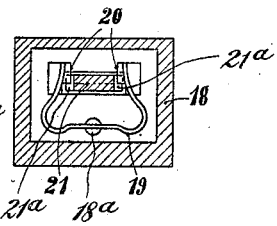
Figure 9:
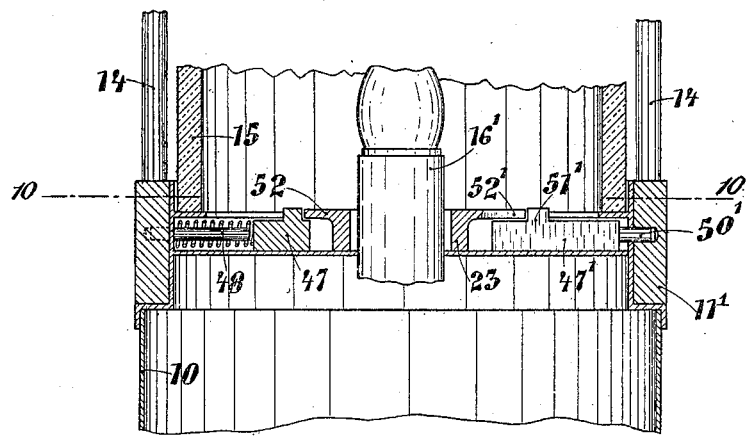

In the accompanying drawings: Figure 1 is a vertical section, partly broken, of a miner's lamp provided with my improved locking device; Fig. 2 a cross section on line 2—2, Fig. 1; Fig. 3 a side view, partly in section, of the lighting device; Fig. 4 a vertical section on line A—B, Fig. 2; Fig. 5 a vertical section, partly broken away, of a modification; Fig. 6 a plan thereof with the upper part removed; Fig. 7 a detail section of part of the igniting device shown in Figs. 5 and 6; Fig. 8 a similar section, showing the parts in a different position; Fig. 9 a vertical section through a further modification, and Fig. 10 a cross section on line 10—10, Fig. 9.

Upon the cylindrical fuel reservoir 10 of the lamp is mounted a collar 30 which is embraced by a rotatable ring or chimney holder 11 provided with inwardly extending inclined projections 12 adapted to engage a corresponding outwardly extending projection 13 of collar 30, parts 12 and 13 constituting collectively a screw lock. From ring 11 extend upwardly a suitable number of posts 14 connected on top by the usual cap, (not shown), and adapted to hold chimney 15 in position. To collar 30 is secured a flanged disk or cover 30ª, forming the top of reservoir 10, and provided with a burner tube 16 which is vertically adjustable by screw spindle 17 and contains wick 16ª.

Within a diametrically extending recess or groove 30ᵇ of cover 30ª, is received a slide or plunger 23 provided with a pair of outwardly extending pins or prongs 25 and 26 passing through corresponding bores of collar 30 and adapted to enter a pair of recesses 27 of ring 11. Slide 23 is slotted as at 28 for the passage of tube 16, and is influenced by a spring 24 which tends to push slide 23 inward. Opposite recesses 27 ring 11 is enlarged as at 18, to form a chamber or spring housing. Through enlargement 18 passes a locking bolt 21 provided with an inwardly extending foot or projection 22 received within groove 30ᵇ, and adapted to bear against slide 23. Within chamber 18 is mounted a stud 18ª, to which a substantially U-shaped spring 19, of magnetizable material, is secured. To the free ends of the latter are attached magnetizable shoes 20 adapted to enter a pair of opposed notches 21ª of bolt 21.

It will be seen that when the bolt is withdrawn from the lamp, spring 24 will push slide 23 inward, to retract prongs 25, 26 from recesses 27, so that ring 11 may be partially rotated upon collar 30. In this way projections 12 are withdrawn from projections 13, so that ring 11 may be removed from lamp 10. If it is desired to lock the lamp, ring 11 is brought into the proper position and bolt 21 is inserted into ring 11, whereby the free ends of spring 19 with shoes 20 are spread by the beveled edges 21ᵇ of bolt 21, shoes 20 finally entering notches 21ª. During this operation slide 23 has been advanced by foot 22 of bolt 21, so that prongs 25, 26 have entered recesses 27, to firmly lock the lamp.

For opening the lamp, a powerful horseshoe magnet is used, which is so held that its poles are placed opposite the free ends of spring 19. The latter will thus be distended, so as to withdraw shoes 20 from recesses 21ª, whereupon bolt 21 is partly pressed outward by spring-influenced slide 23. Bolt 21 may now be removed by hand, so that the top of the lamp may be taken off in the manner described.

In order to admit the air necessary for combustion to the flame, I provide ring 11 with a series of ducts 29 that open into an inner channel 30ᶜ of ring 11, whence the air passes through apertures 31 of collar 30 into an annular recess 30ᵈ formed between collar 30 and cover 30ª. Recess 30ᵈ is partly closed on top by a wire gauze 32 through which the air must pass before reaching the flame.

In order to automatically extinguish the lamp when the same is opened, a cap 33 is provided which is adapted to close the upper opening of wick tube 16. Cap 33 is riveted at 33ª, to a lever 34ª pivoted at 34ᵇ to the wick tube guide above lamp cover 30ª. A lower extension 34 of this lever is received within a corresponding recess 35 of slide 23. It will thus be seen that when the lamp is opened and slide 23 is retracted, lever 34ª will be automatically tilted so as to place cap 33 over tube 16. When the lamp is closed, the advancing slide 23 will so swing lever 34ª, that cap 33 clears tube 16.

The lighting arrangement which I prefer to use is similar to that shown in British patent No. 23,229, of 1905. It comprises essentially a reciprocating and rotatable pin 38 mounted in a vertically reciprocating casing 37, and provided with an inverted U-shaped friction pin 39 adapted to ignite the tape, (not shown). From casing 37 extends laterally a projection or nose 40 which engages the lower side of slide 23 when the lamp is closed. In this way casing 37 and pin 38 are prevented from being raised while the pin is rotated, so that the necessary friction is produced between the roughened edge 39ª of head 39, and the igniting tape. If the lamp is unlocked, a recess 41 of slide 23 becomes alined with nose 40, so that upon the raising of pin 38, nose 40 cannot obtain the necessary hold on the lower surface of slide 23, to thereby draw edge 39ª of head 39 against the igniting tape. As the device is so constructed that for its operation considerable friction is necessary between edge 39ª and the tape, the ignition of the lamp will thus be impossible, while the same is open.

Figs. 5–8, illustrate an igniting device comprising essentially a rotatable spindle 42, to the upper end of which a crown 43 is secured. Stem 42 is provided with a flattened section 45 which is adapted to enter a suitable recess 46 of slide 23 when the lamp is closed, (Fig. 7). When the lamp is open, (Figs. 5, 6 and 8), section 45 extends along the unrecessed section of slide 23, so as to prevent crown 43 from being rotated. Thus it is impossible to light the lamp while the same is open.

Figure 10:
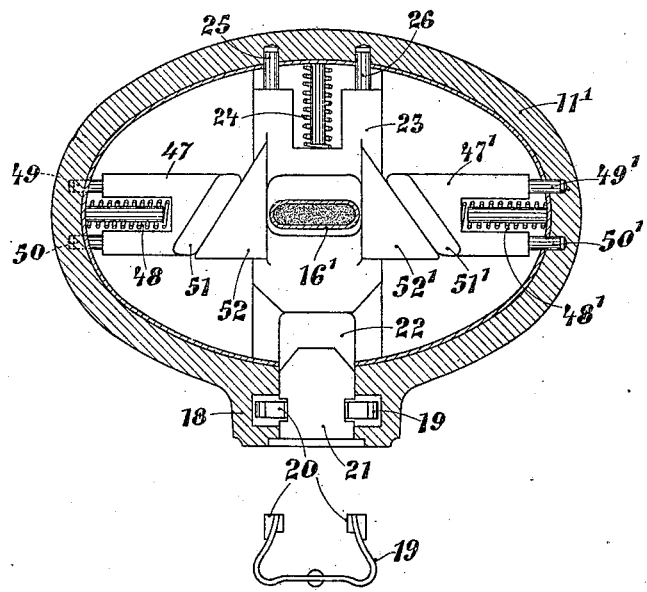

In a modification illustrated in Figs. 9 and 10, the lamp body is oval, while projections 12 and 13 are replaced by slides 47 and 47', which are provided with beveled sections 51, 51', respectively. These beveled sections are adapted to engage wedge-shaped lateral projections 52, 52', of slide 23. Slides 47, 47', are influenced by springs 48, 48', and are provided with prongs 49, 50, and 49', 50', respectively, that are adapted to engage corresponding recesses of oval chimney hopper 11'. The lamp is thus normally locked by the three pairs of pins and the bolt 21, while upon the withdrawal of the latter, in manner hereinabove described, the pins also clear holder 11', so that the lamp may be opened.

I claim:

1. A miner's lamp comprising a reservoir, a chimney holder removably secured thereto, a spring-influenced plunger carried by the reservoir and adapted to lock the chimney-holder to said reservoir, and a bolt for actuating the plunger, said bolt being also adapted to lock the chimney-holder to the reservoir, substantially as specified.

2. A miner's lamp comprising a reservoir having a grooved cover, a chimney holder removably secured thereto, a spring-influenced plunger slidable in the cover-groove and adapted to engage the chimney holder, and a bolt adapted to engage the plunger, substantially as specified.

3. A miner's lamp comprising a reservoir, a wick, means carried by the reservoir for igniting the wick, a chimney holder removably secured to the reservoir, a plunger adapted to lock the holder to the reservoir, and means controlled by the plunger for rendering the igniting device inoperative when the holder is unlocked from the reservoir, substantially as specified.

Signed by me this eighteenth day of February 1908.

OTTO MAX MÜLLER.

Witnesses:
PETER LIEBER,
WILHELM FLASCHE.